United States Patent [19]

White

[11] Patent Number: 5,294,410
[45] Date of Patent: Mar. 15, 1994

[54] GAS PURIFICATION AND CONDITIONING SYSTEM

[75] Inventor: David J. White, San Diego, Calif.

[73] Assignee: Solar Turbine Incorporated, San Diego, Calif.

[21] Appl. No.: 891,251

[22] Filed: Jun. 1, 1992

[51] Int. Cl.$^5$ .................................................. B01D 50/00
[52] U.S. Cl. ..................................... 422/171; 55/437;
 55/456; 55/473; 422/173; 422/177
[58] Field of Search ............................ 422/169-171,
 422/173, 177, 211, 201; 55/437, 456, 457, 473

[56] References Cited

U.S. PATENT DOCUMENTS

| | | | |
|---|---|---|---|
| 2,545,194 | 3/1951 | Colburn et al. | 183/114.2 |
| 2,818,323 | 12/1957 | Haensel | 23/2 |
| 3,104,162 | 9/1963 | Skarstrom | 55/58 |
| 3,196,596 | 7/1965 | Miller | 55/48 |
| 3,242,651 | 3/1966 | Arnoldi | 55/179 |
| 3,355,860 | 12/1967 | Arnoldi | 55/31 |
| 3,469,934 | 9/1969 | Bocard et al. | 23/4 |
| 3,491,031 | 1/1970 | Stoneburner | 252/411 |
| 3,497,312 | 2/1970 | Zeff et al. | 23/4 |
| 3,659,400 | 5/1972 | Kester | 55/33 |
| 3,729,902 | 5/1973 | Ventriglio et al. | 55/389 |
| 3,826,089 | 7/1974 | Nakajima et al. | 422/171 X |
| 3,891,411 | 6/1975 | Meyer | 55/26 |
| 3,960,522 | 6/1976 | Munzner et al. | 55/68 |
| 4,005,708 | 2/1977 | Netteland et al. | 128/142 |
| 4,012,206 | 3/1977 | Macriss et al. | 55/34 |
| 4,030,896 | 6/1977 | Wimber et al. | 55/33 |
| 4,046,709 | 9/1977 | Yuki | 252/421 |
| 4,054,418 | 10/1977 | Miller et al. | 422/17 |
| 4,165,972 | 8/1979 | Iles et al. | 55/28 |
| 4,197,095 | 4/1980 | White, Jr. et al. | 55/20 |
| 4,222,750 | 9/1980 | Gauthier et al. | 55/58 |
| 4,308,233 | 12/1981 | Narumiya et al. | 422/169 |
| 4,336,159 | 6/1982 | Winter | 252/411 |
| 4,420,415 | 12/1983 | Yuki et al. | 502/180 |
| 4,472,178 | 9/1984 | Kumar et al. | 55/25 |
| 4,472,198 | 9/1984 | Nowicki et al. | 106/83 |
| 4,482,365 | 11/1984 | Roach | 55/218 |
| 4,511,375 | 4/1985 | BeVier | 55/28 |
| 4,526,887 | 7/1985 | Sutt, Jr. | 502/420 |
| 4,533,365 | 8/1985 | Ringel | 55/28 |
| 4,540,678 | 9/1985 | Sutt, Jr. | 502/5 |
| 4,589,890 | 5/1986 | Gronvaldt | 55/59 |
| 4,589,896 | 5/1986 | Chen et al. | 62/28 |
| 4,650,647 | 3/1987 | Kito et al. | 422/169 |
| 4,661,124 | 4/1987 | Hamlin et al. | 55/21 |
| 4,698,073 | 10/1987 | Rohde et al. | 55/33 |
| 4,732,579 | 3/1988 | Veltman et al. | 55/23 |
| 4,738,694 | 4/1988 | Godino et al. | 55/59 |
| 4,786,294 | 11/1988 | Jonqueres et al. | 55/28 |

*Primary Examiner*—Robert J. Warden
*Assistant Examiner*—Krisanne M. Thornton
*Attorney, Agent, or Firm*—Larry G. Cain

[57] ABSTRACT

Gas purification systems presently use air bleed from an engine and further remove carbon dioxide therefrom. The present gas purification and thermal conditioning system also bleeds from the engine, however; the gas is further partially filtered to remove solids. The gas is heated to a preestablished level having a temperature of between 800 to 1000 degrees Fahrenheit by using a first heat exchanger or recuperator. The system further purifies the gas by using a reactor system including a thermal reactor and a catalytic reactor. The system further purifies the gas by using a polisher and an absorber. After the gas has been purified, the gas is thermally conditioned by a supersonic turbine so that the gas temperature is usable for its intended purpose.

15 Claims, 3 Drawing Sheets

GAS PURIFICATION AND CONDITIONING SYSTEM

DESCRIPTION

1. Technical Field

This invention relates generally to the environmental control and more particularly to systems for controlling of objectionable impurities and conditioning of the temperature of oxygen containing gas or air for public consumption.

2. Background Art

The increasing need to restore chemical and toxic landfill sites and the possibility of chemical and biological warfare has brought to the forefront the need for an air purification and decontamination system to be used in conjunction with landfill and possible chemical and biological warfare operations.

With reference to the chemical and biological warfare aspect, both the Soviet Union and the United States have introduced binary and trinary chemical weapons wherein two or more stable innocuous reactants can be held in separate compartments of the munition. This eases production, storage and deployment problems. At the time the munition is employed, an explosive charge would introduce the reactants together to produce the desired chemical agent. Unstable and extremely toxic agents can thus be deployed in a conscious manner.

There has been the realization in recent years that the environment for future wars is likely to be much different from those of the past. The urbanization of many countries in Europe has created a scenario in which, if a land invasion were to be made from the East, a great deal of fighting would inevitably take place in cities and urban areas. It is generally conceded that with conventional weapons the balance of power in such urban warfare would be with the defenders. The Soviet Union and other countries have acknowledged the above trends and it is believed that the inevitability of urban conflict will create sufficient incentive to initiate chemical and/or biological warfare. In addition to fighting in urban areas, it would be desirable to seize, rather than destroy, many targets including air bases and communication systems such as control centers, combat targeting centers, and intelligence data processing centers. Many other command and control centers would also be major targets. The object being not to physically destroy these targets but to merely destroy the residences therein until the opposition can occupy them and put them to their own use by the proper selection of agents. Target denial time periods could range from hours to weeks. For such target denial chemical weapons offer unique advantages especially where the residences therein have inadequate protection and decontamination capabilities. Such warfare would allow a high rate of troop advancement, and would avoid any escalation to tactical nuclear levels. In addition, it would probably exploit the inherent imbalance between attack and defense found in chemical and biological warfare. As a general rule, a toxic agent is first discovered and possibly used and then later in response to the employment of the agent a defensive approach is developed.

Industry has a vested interest in gas or air purification, primarily because of their commitment to the future production of integrated power and environmental control systems. The present production units can be supplied to produce a range of cooling capacities with concurrent electrical power generation. It is planned to extend these packages and provide not only electrical power and cooling, but also air purification, hot air and hot water or steam for decontamination; essentially all the needs of a major hospital or a chemical and biological warfare collective protective system. The first step toward the production of this chemical and biological warfare collective protective package has been identified as the development of an effective air purification or chemical and biological agent destruction subsystem.

An example of such an air purification system is disclosed in U.S. Pat. No. 4,786,294, to M. A. Jonqueres et al. issued Nov. 22, 1988. The Jonqueres patent discloses an air purification and thermal conditioning system for aircraft cabin use. The system includes bleeding air from the engine and a pair of regenerating chemically impregnated molecular sieve to remove carbon dioxide from the bled air.

Another example of an air purification system is defined in the art as batch processes and generally includes conventional activated charcoal absorption systems. These batch processes have a limited life, are susceptible to "bed breaking" and must either be replaced or regenerated when saturated with chemical agents. One of the major problems with these charcoal beds is the inability, at present, to determine when "break through" of a particular agent is imminent. Other problems include the logistics of supply and the difficulty of desorbing certain agents during regeneration.

DISCLOSURE OF THE INVENTION

In one aspect of the present invention, a gas purification and thermal conditioning system for removal of an objectionable impurity generally not acceptable for public consumption and temperature control of the purified gas for future use in a confined area is disclosed. The gas purification and thermal conditioning system includes means for compressing the partially purified gas and means for at least partially filtering an objectionable condensed phase impurity from the gas. The system further includes means for increasing the temperature of the compressed and partially purified gas from the filtering means. The system further includes means for further purifying the gas including a reactor system and means absorbing impurities from the partially purified gas and means for reducing the temperature of the purified gas to a level acceptable for public consumption.

In another aspect of the present invention, a gas purification and thermal conditioning system for removal of an objectionable impurity generally not acceptable for public consumption and temperature control of the purified gas for future use in a confined area is disclosed. The system includes a gas turbine engine having a compressor section, a combustor section interconnected with the compressor section and a hot exhaust exiting the gas turbine engine. The system further includes a condensed phase gas filtering/separating apparatus through which gas to be purified passes therethrough and is at least partially purified. The compressor section has a compressor therein being in fluid communication with the gas filtering apparatus. The system further includes a heat exchanger being in fluid communication with the compressed partially purified gas, the heat exchanger increasing the temperature of the compressed partially purified gas and means for further purifying the gas including a reactor system and means for absorbing through reaction undesirable decomposition products. The system further includes an optional means for polishing the compressed partially purified gas. The means for polishing has a solids filter and an alkaline absorber therein. A second heat exchanger being in fluid communication with the purified gas reduces the temperature of the purified gas to a level acceptable for public consumption.

BEST MODE FOR CARRYING OUT THE INVENTION

Figure 1:
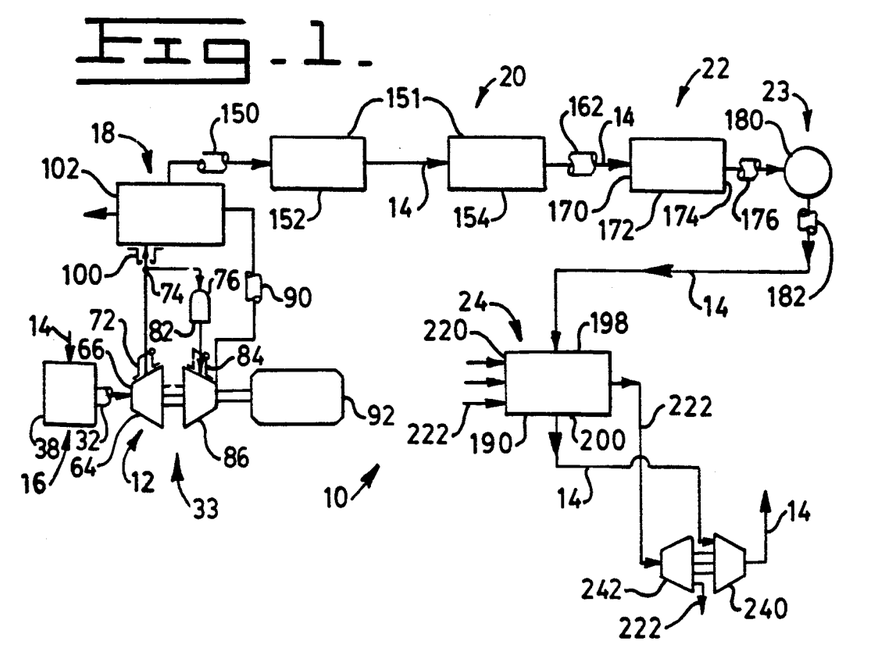
FIG. 1 is a generally schematic view of the present invention.

In reference to FIG. 1, an air or gas purification system is shown in two optional configurations. The first of these options includes the following components. Means 12 for compressing the air or gas, designated by arrow 14. Means 16 for partially filtering objectionable condensed phase impurities from the compressed air or gas 14. Means 18 for increasing the temperature of the partially filtered compressed air or gas, and means 20 for purifying or further filtering the air or gas of any objectionable gaseous or remaining condensed phase materials. Means 20 also includes a means 22 for polishing and an absorption means 23 that removes any objectionable by-products such as hydrohalic acid gases and sulfur compounds that might be produced. The means 22 and means 23 further purify the air or gas. Means 20 accomplishes the removal of toxic and objectionable compounds that may be present in the heated air by first catalytically decomposing or cracking the compounds. This cracking process is catalyzed by a variety of materials. Typical cracking catalysts include chromia, alumina often doped with chromia and zirconia again usually used in admixture with chromia. Other catalysts that could be used include titania, silica, and vanadia. Of these catalysts the alumina/chromia and the zirconia/chromia are the preferred candidates due primarily to their ability to withstand the effects of hydrohalic acid gases formed when halogenated compounds are cracked in the presence of water vapor. These catalytic materials are deposited on a "washcoat" that in turn is layered on a monolithic support. The washcoat can consist of gamma alumina, silica or titania. If high levels of halogen acid gases are anticipated the silica or titania washcoats may be preferred. For general purpose use however the gamma alumina washcoat is usually recommended. This washcoat is important in that the effective area for the catalyst can decrease with time. During operation the washcoat can vitrify loosing its microporosity. This reduction in the microporosity reduces the effectivity of the catalyst. Typical monolithic substrates suitable for supporting these cracking catalysts include a wide range of ceramic materials such as cordierite, mullite, alumina, and titania. The preferred ceramic substrate is cordierite. Metal monolithic substrates can also be used. This type of substrate is usually made from stainless steel that has been aluminized. Through controlled high temperature oxidation of the aluminized metal a coherent film of alumina can be formed on the surface. This alumina film is equivalent to the washcoat on the ceramic monoliths. To ensure that halogens produced during the cracking reactions react further to the corresponding hydrohalic acid gas, water must be provided in sufficient quantity to satisfy the reactions. If the heated air is dry then water must be added to the air stream before it enters the cracking reactor. This water enters into the catalytic reactions modifying them so that the hydrohalic acid gas is produced. Generally ambient air in most parts of the world contains sufficient water to allow the hydrohalic acid gases to be formed.

After the cracking reactor the heated air and decomposed chemical species pass into an acid gas absorber. This absorber which is part of the air purification means 20 reacts with and fixes the hydrohalic acid gases and any sulfur containing gases that are produced during the cracking reactions. This absorber is a packed bed of some form containing a combination of zinc and calcium salts. A bed of marble chips mixed with zinc oxide balls for example can be used as an effective absorber bed. A more desirable approach is to use the double oxide of calcium and zinc which can be mixed with a binder and formed into various shapes. Shapes that minimize pressure drop can be formed and packed into beds or arranged to form a reactor with individual channels. The latter double oxide is the preferred approach to absorb acid gases. This bed which is intended to effect the removal of undesirable acid gases from the air also protects the second catalytic reactor located downstream of the absorber from the effects of the various acid gases.

The second catalytic reactor is an oxidation reactor that preferredly uses a non-noble metal catalyst based on copper and manganese oxides to oxidize the daughter fragments of the decomposed chemical species leaving the cracking reactor and absorber bed. This reactor is the last piece of the air purification means 20. A multicomponent catalyst is preferred consisting of cupric oxide and manganese dioxide at the entry end of the reactor and cuprous oxide mixed with zinc oxide at the rear. Noble metal catalysts such as platinum and palladium can also be employed. The catalytic materials are usually deposited on and are supported by a washcoat of gamma alumina. Other wash coats including silica and titania can also be used and these have been described above under the description of the cracking reactor. In turn the washcoat is supported by a similar monolith to that used in the cracking reactor. Cordierite and stainless steel are the two preferred monolith substrate materials. When light weight is required metal monoliths are used and in all other cases cordierite is preferred. Other monolith materials can be used such as mullite, alumina, silica, titania, and zirconia.

Figure 2:
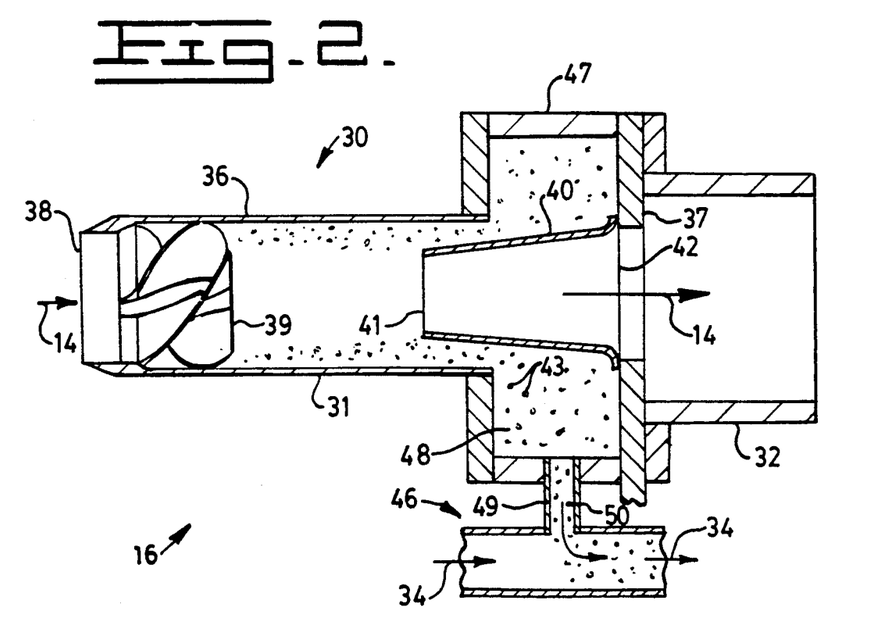
FIG. 2 is a detailed view of a filter apparatus used with the present invention.

As best shown in FIGS. 1 and 2, the means 16 for at least partially filtering of objectionable impurities from the gas 14 includes a conventional filter apparatus 30 which in this application is a cyclone filter 31 attached in a conventional manner, such as by ducting 32, to a conventional gas turbine engine 33 having an inlet air flow, also designated by the arrow 14, and an exhaust flow, designated by the arrows 34. The cyclone filter 31 chosen includes a generally cylindrical housing 36 having an outlet end 37 and an inlet end 38 in which is positioned a vortex generator 39. A generally conical shaped pick-up tube 40 is generally centered within the housing 36. The tube 40 has an inlet opening 41 having a preestablished area opening and the inlet opening 41 faces the vortex generator 39. The tube 40 further includes an outlet opening 42 positioned near the outlet end 37 of the housing 36. The outlet opening 42 has a larger area opening than the inlet opening 41. The outlet opening 42 is in fluid communication with the inlet opening 41 and is in fluid communication with the air inlet flow 14 of the gas turbine engine 33. The cyclone filter 31 has the capabilities of removing particles, designated by the numerical 43, with a diameter larger than 5 microns. Further included in the means 16 for at least partially filtering an objectionable impurity from the gas 14 is a conventional scavenging system 46. The system 46 uses a portion of the gas turbine engine 33 exhaust gas flow 34 equivalent to approximately 10 percent of the original exhaust gas flow 34. The system 46 includes an enlarged portion 47 formed near the outlet end 37 of the housing 36 in which is formed a chamber 48. A bleed tube 49 is positioned in the enlarger portion 47 and forms a passage 50 therein being in fluid communication between the chamber 48 and the gas turbine engine 35 exhaust gas flow 34. The impurities 43 having a diameter larger than 5 microns are separated and deposited in the chamber 48. The impurities 43 are scavenged from the chamber 48 through the passage 50 and dispersed into the contaminated atmosphere from which they came.

Figure 3:
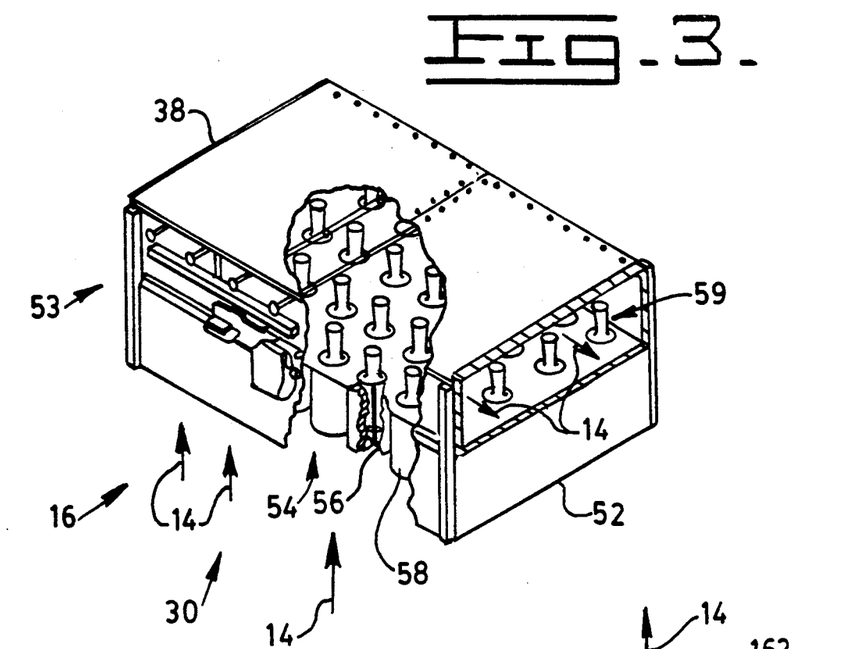
FIG. 3 is a detailed view of an alternative filter apparatus used with the present invention.

As an alternative and best shown in FIG. 3, the filter apparatus 30 includes a single stage barrier filter 52 having the capabilities of being self-cleaning. The single stage barrier filter 52 can be used as a stand-alone unit 53 or as an integral part of a mobile system. The components and function of the stand-alone and the mobile system are identical and will be described as a single unit. The stand-alone unit 53 has a generally rectangular cubic shape. The unit includes an inlet end 54 having a plurality of apertures 56 therein, only one shown. Each of the plurality of apertures 56 has a filter cartridge 58 attached thereto. The unit 52 also includes an outlet end 59.

Figure 5:
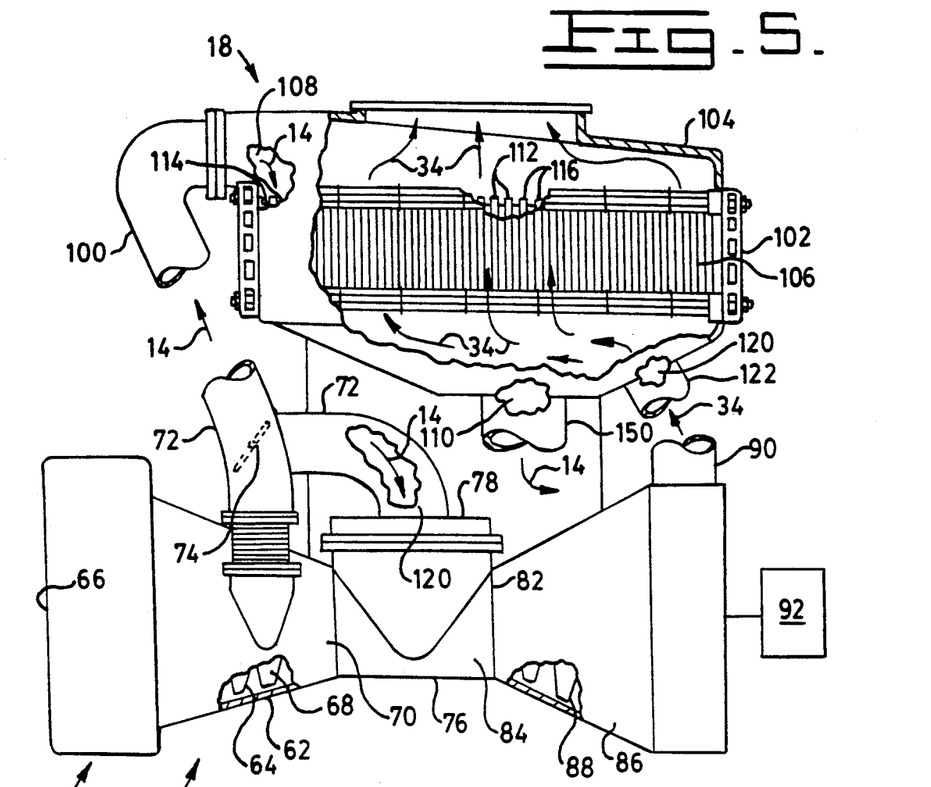
FIG. 5 is an enlarged partially sectioned view of a first heat exchanger or recuperator attached directly to an engine and used with the present invention.

As best shown in FIGS. 1 and 5, the means 12 for compressing the partially filtered gas in this application includes at least a portion of the conventional gas turbine engine 33. The conventional gas turbine engine 33, although only partially shown, includes an external housing 62, a compressor section 64 being positioned within the housing 62. The compressor section 64 has an inlet end 66 interconnected to the means 12 with conventional ducting 32. The compressor section 64 further includes a compressor 68 and an outlet end 70. From the outlet end 70, the compressed gas is directed through conventional ducting 72, only partially shown, to a control valve 74 wherein the compressed gas 14 is divided and distributed to the engine 33 and the means 18 for increasing the temperature of the partially filtered gas 14 in a preestablished ratio. In this application the ratio of the gas distributed to the means 18 for increasing the temperature and to the engine are approximately 1 to 5. The engine 33 further includes a combustor section 76 having an inlet portion 78 connected to the conventional ducting 72 through which the gas 14 directed by the valve 74 enters into the combustor section 76. A combustible fuel, not shown, is supplied to the combustor section 76 and mixed with the gas 14 directed by the valve 74 to the engine 33 from the outlet end 70 of the compressor section 64. Within the combustor section 76, the fuel and the gas 14 are mixed, combusted and results in the exhaust gas 34 being formed. The expanding exhaust gas 34 from the combustor section 76 exits an outlet portion 82 in a conventional manner. The combusted gas 34 exiting the outlet portion 82 of the combustor section 76 passes through further conventional ducting 84, only partially shown, within the engine 33 and is directed to a power turbine section 86. A turbine 88 of the power turbine section 86 is rotated by the combusted expanding gases 34. The turbine 88 is drivingly connected to the compressor section 64 and drives the compressor 68 of the compressor section 64 in a conventional manner, not shown. After the combusted gas 34 passes through the turbine 88, the combusted gas 34 exits through an exhaust system 90. The turbine 88 is also drivingly connected to a conventional electric generator 92 for providing electrical energy.

As further shown in FIG. 1, a portion of the gas 14 from the compressor section 64 is directed through conventional ducting 100, only partially shown, to the means for at least partially filtering objectionable impurities from the gas 14 and is further directed through conventional ducting 100 to the means 18 for increasing the temperature of the compressed partially filtered gas. In this application and best shown in FIG. 5, the means 18 for increasing the temperature of the partially filtered gas exiting the compressor section 64 includes a conventional primary surface heat exchanger or recuperator 102. The heat exchanger 102 includes a housing 104 in which a core 106 is positioned. The housing 104 includes an inlet portion 108 and an outlet portion 110. The core 106 includes a plurality of primary surface plates 112 stacked in spaced side-by-side relation to one another. The outer periphery of successive pairs of the plates 12 are joined together in the usual manner to form alternate gas 14 flow passages 114 and exhaust gas 34 flow passages 116. The inlet 108 is in fluid communication with the gas 114 flowing from the control valve 74. A second inlet 120, only partially shown, is in fluid communication with the flow of exhaust gas 34 entering the heat exchanger 102. Conventional ducting 122, only partially shown, connects the exhaust system 90 and the heat exchanger 102. In this application, a portion of the compressed gas 14, which has been partially filtered of objectionable impurities enter the heat exchanger 102, is heated to a temperature of between 800 and 1000 degrees Fahrenheit and exits the heat exchanger 102.

Figure 4:
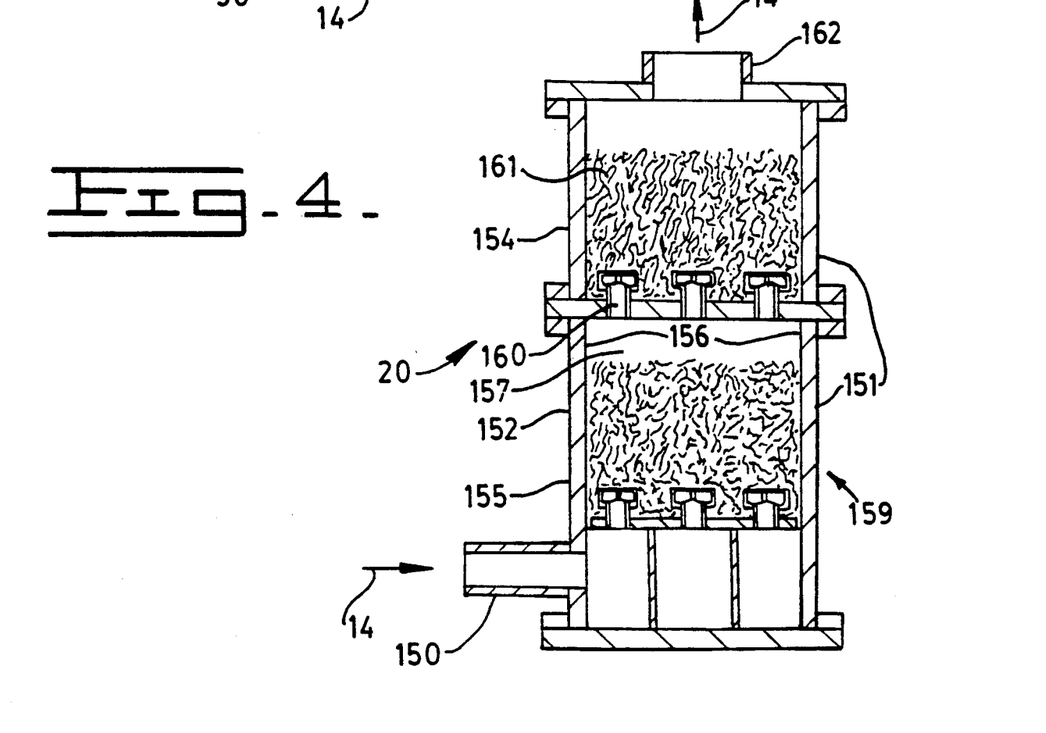
FIG. 4 is more detailed schematic view of a portion of the gas purification and thermal conditioning system of the present invention.

From the heat exchanger 102, the compressed gas 14 which has been partially filtered and heated enters into the means 20 for further purifying the gas by a conventional duct 150, only partially shown. As best shown in FIGS. 1 and 4, the means 20 for further purifying the gas includes a high temperature system having a two-stage reaction process 151. The process 151 includes a pair of reactor beds including a thermal cracking reactor or decomposer 152 and a catalytic oxidation reactor 154. The thermal cracking reactor 152 consists of a cylindrical reactor bed 155 having inner walls 156 being coated with a monolithic honeycomb of cordierite and packed with x-alumina doped with chromia. As an alternative a plurality of chromia promoted alumina Raschig rings 157 could be used to pack the cylindrical reactor bed 155. When using the Raschig rings 157, the rings 157 are approximately 5 mm in diameter. The monoliths in this application has either square or rounded triangular cross-sectional cells. The number of cells per square inch of cross-sectional area varies from 400 cpi to 1000 cpi depending on the application. Monolith materials of construction include cordierite, millisite, alumina, zisconia, titarnia, lithium aluminum silicates and metal or metal alloy that can form an adherent alumina coating.

The thermal cracking reactor 152 consists of a monolithic substrate constructed from one of the materials listed above. The inner walls 156 are coated with x-gamma alumina doped with chromia at a concentration of approximately 3 percent. At the rear of the thermal reactor 152, the gas 14 containing daughter fragments of the original contaminates is constrained to pass through another monolith heavily coated with a mixture 159 of crystalline calcium carbonate (70 percent by weight), magnesium oxide (10 percent by weight) and zinc oxide (20 percent by weight). Any hydrogen acid garner or other acid garner present in the gas 14 stream will react with these materials and are thus fixed, and retained within this intermediate monolith. As an alternative the thermal cracking reactor 152 could include a packing of mixed crystalline calcium carbonate, magnesium oxide and zinc oxide. After being reacted upon by the thermal cracking reactor 152, the gas 14 and partially non-absorbed fragments which include any objectionable impurities enter into the catalytic reactor 154 which includes, in essence, an afterburner 160 packed with a oxidation catalyst. The oxidation catalyst, in this application, is a mixture 161 of a promoted copper oxides, of both cuprous and cupric oxides. Promotion of the cupric oxide 161 can be by manganese chromium or by zinc. As an alternative promoter, a copper oxide mix can be deposited on the internal passages surfaces of a monolith. These surfaces will be coated with x-alumina as a "wash coat" or "bond coat" before being coated with the copper oxides. The promoted copper oxide mix will be deposited at the front of an inlet section of the monolith. Cuprous oxide are coated on those surfaces in the rear of this catalytic reactor to provide a measure of extra protection against hydrogen cyanide penetrating through both reactors. The cuprous oxides are very specific catalyst for the oxidation of hydrogen cyanide and are utilized as beads in the catalytic reactor 154 and are coated onto the Raschig rings 157 when used. When coated into the Raschig rings 157, a concentration of about 10 percent is used. The residence time required of the gas 14 within the reactors 151 is based on the rate of diffusion of the specific impurity in the gas 14 to the catalytic surface available. This rate depends primarily on the molecular weight of the specific impurity present and to a lesser extent on the temperature of the reactors 151. Typical dimensions for a 50 scfm gas 14 flow catalytic reactor 154 operating at 850 degrees Fahrenheit and ambient pressure would be approximately 117 mm in diameter and 127 mm in length. The thermal cracking reactor 152 would be longer, typically 229 mm long for the same overall diameter. The size of the calcium carbonate reactor absorption section depends on life requirements of a particular challenge. After being further purified, the gas 14 exits the catalytic reactor 154 through a conventional duct 162.

The ducting 162 can be connected to an inlet end 170 of the means 22 for "polishing". The use of the means 22 provides an optional step that provides further protection against any acid garner breaking through the two reactors 151. The means 22 for polishing includes a conventional polisher 172. The polisher 172 includes a solids filter and an alkaline absorber. In the polisher 172 objectionable impurities, which are basically in the form of acid gas materials produced from sulfur, chlorine or fluorine present in the gas 14, are removed. The polisher 172 includes basically sodium carbonate monohydrate packed therein and has an outlet end 174 from which the further purified gas 14 is directed to a conventional duct 176. To further enhance the system 10, the polishing means 22 can be used in conjunction with an acid gas sensor to provide an indication that the reactant-absorbent section is functioning properly or improperly. The sensor would be mounted in the duct between the oxidation reactor and the alkaline polisher. Any acid garner penetrating through the sensor due to the failure or saturation of the reactant material located between the cracking and oxidation reactors will cause an alarm to sound. This alarm indicates that the polishing bed is now the main reactant absorb medium and that the intermediate reactant material needs to be replaced. The time interval available for intermediate reactant replacement will depend on the size of the polishing bed.

Figure 6:
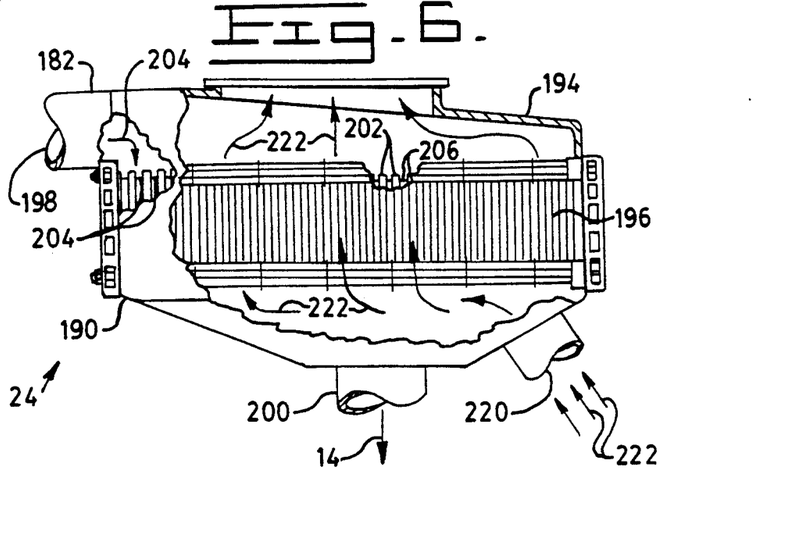
FIG. 6 is an enlarged partially sectioned view of a second heat exchanger or recuperator used with the present invention.

As best shown in FIG. 6, a second primary surface heat exchanger or recuperator 190 similar to the primary surface heat exchanger 102 is used. The heat exchanger 190 includes a housing 194 in which a core 196 is positioned. The housing 194 includes an inlet 198 and an outlet 200. The core 196 includes a plurality of primary surface plates 202 stacked in spaced side-by-side relation to one another. The outer periphery of successive pairs of the plates 202 are joined together in the usual manner to form alternate hot gas 14 dissipation passages 204 and cooling gas recipient passages 206. The inlet 198 is in fluid communication with the purified gas 14 flowing from the alkaline absorber 180 through the conventional ducting 182 and flows through the second heat exchanger 190 and the hot gas 14 dissipation passages 204. A second inlet 220, only partially shown, is in fluid communication with a cooling media, designated by arrow 222, which in this application is ambient air and passes through the second heat exchanger 190 and the cooling gas recipient passages 206. As an alternative, depending on the geographic location of the system 10, the second heat exchanger 190, could be a conventional liquid-to-air or air to air type exchanger wherein the gas 14 could be cooled by a liquid such as water of spent air from another process. An example of such a heat exchanger would be a tube-and-shell or finned tube type heat exchanger.

A fan 240 is used to direct the purified gas 14 through the heat exchanger 190 and into the compartment in which the purified gas is to be used. In many applications, an air cycle environmental control system is used to cool the air after precooling by the heat exchanger above. As an alternative, the pressure drop of the gas 14 from high pressure to ambient can be used to direct the gas 14 flow through the second heat exchanger 190.

In this particular application, the gas 14 has been bled from the outlet end 70 of the compressor section 64 of the gas turbine engine 33 and is at high pressure; typically at 8 to 30 atmospheres. At these pressures, which are considerably higher than those normally associated with air cycle environmental control units (ECU) a modified expansion turbine has to be used. For these applications, a supersonic gas turbine is used. This turbine could be either a single or multiple stage of turbine depending on the pressure ratio. At low pressure rations (less than 12 atmospheres) a single stage would be used whereas at higher rations multiple (up to three) stages would be used. The center stages could be supersonic, transonic or subsonic as needed. The supersonic turbine is connected directly to a high speed alternator with solid state rectification to 570 VDC. This alternator essentially absorbs power from the expanding gas 14 passing through the turbine, thus cooling the gas 14 substantially. The use of the supersonic turbine and high operating gas 14 pressure allows the overall system 10 size and weight to be substantially reduced when compared to conventional air cycle environmental control units. In addition by using a direct drive high speed alternator to absorb the power, the alternator eliminates the need for a compressor and is much smaller. The electrical power produced can be used to operate other components within the vehicle or cab where the power is needed. In general, the environmental control units would not be a single package but rather a set of components distributed and integrated with the vehicle subsystems where appropriate. This distributed placement allows better use of the component function. For example, heat exchanger placement can reduce the vehicle infrared signature. The cool down heat exchanger could for example use air previously used for cooling electronics to reduce the temperature of the purified air. This would eliminate the need for an extra blower.

Industrial Applicability

The gas 14 purification system 10, as applied by the applicant, is virtually a continuous process. The system 10 is capable of operation for extended time periods providing fuel is available to the gas turbine engine 33 used to supply the pressure gas 14 and power source. The system 10 further includes the capability to be adapted to supply hot air and hot water or steam for future use. Hot air, for example, would be used in decontaminating "active" protective clothing that utilizes an activated charcoal layer as a defense against chemical agents. Such clothing can be readily decontaminated by "tumbling" in a high temperature air flow. Similarly hot water or steam would be needed for the decontamination of equipment and passive or impermeable protective garments. Provision for supplying both hot water and increased hot air levels could be provided with the system 10 as defined herein. The availability of such supplies allows ingress and egress to the shelter, cab or confined area as a practical proposition. Without this ability to provide hot water and increased hot air decontamination that is integrated into the shelter, a loss of protective equipment would ensue which would lead to a loss in mobility and a loss of defensive capability.

In this application, the basic package adopted for reference purposes is a 60 kW electrical supply system with 600,000 Btu of cooling capacity with a flow rate of approximately 38 cubic meters per minute. This unit weighs approximately 344 kg and has a volume of approximately 6 cubic meters. The power impact base or goal is compatible with maintaining a cab or shelter temperature less than 75 degrees Fahrenheit and a relative humidity of less than 60 percent. These later values are considered necessary for the survival of both personnel and electronic equipment if the cab or shelter is to be used for long time periods. This system is a stand-alone unit that needs no energy input other than fuel.

The present gas 14 purification system 10 has as one of its goals to radiologically protect the gas 14 through filtration to be used for public consumption. The gas turbine engine 33 is used to blow contaminated gas 14 through the standard vortex separator 31 with capabilities of removing particles 43 with diameters larger than 5 microns. The particles 43 having a diameter larger than the 5 microns which are removed by the vortex separator 31, collected and removed by the scavenging system 46. The remainder of the gas 14 is passed through to the heat exchanger 102. The gas 14 entering the engine 33 is compressed by the compressor 68 and heat is added to the gas 14 during the compressing process. The gas 14 exits the outlet end 70 of the compressor section 64 into the conventional ducting 72 and is directed by the control valve 74 to either the combustor section 76 of the engine 33 or to the particle removal system employing the vortex separator 31 and then to the heat exchanger 102. The portion of the gas 14 directed to the combustor section 76 of the engine 33 is mixed with fuel, combusted and the expanding exhausted gas 34 is used to operate the engine 33 in a conventional manner. The engine 33 is used to drive a generator 92 and provisions can be made to the system to supply supplemental hot gas and hot water, if desired. The portion of the gas 14 directed to the heat exchanger 102 passes through the conventional ducting 100 and enters the inlet 108 of the heat exchanger 102. The gas 14 passes through the gas 14 flow passages 114 and absorbs heat from the exhaust gas 34 traveling through the exhaust gas 34 passages 116. After being heated to a temperature above about 800 degrees Fahrenheit, the gas 14 exits the outlet 110 and enters into the conventional ducting 150. In this application, after being used to heat the gas 14, the exhaust gas 34 is released to the atmosphere.

The gas 14 to be further purified exits the conventional ducting 150 and enters the cracking or thermal reactor 152 wherein the x-alumina coating on the plurality of walls 158 and the crystalline calcium carbonate 159 react with the gas 14 to further purify the gas 14. For example, the x-alumina doped with chromia acts catalytically to dealkylate, dehydrate, and dehalogenate a variety of chemical agents and many other pollutant species. The calcium carbonate 159 absorbs and reacts with any halogen acid gases, magnesium oxide and zinc oxide mix produced. These processes, combined with partial oxidation, break down most agents to mixed low-molecular-weight hydrocarbons. From the thermal reactor 152 the gas 14 enters into the catalytic oxidation reactor 154. In the catalytic oxidation reactor 154, those stable materials, such as phosgene and the partially decomposed agents are eliminated. The catalytic oxidation reactor 154 which can be considered to includes the afterburner 160 uses a mixed copper oxide based oxidation catalyst to oxidize all residual hydrocarbon fragments and carbon monoxide produced. This type of catalyst is especially resistant to poisoning. In addition to the catalytic oxidation activity on hydrocarbons of the cupric-oxide material, it also acts as an efficient decomposer and oxidizer of phosgene. Removal of hydrogen cyanide is partly ensured by the cuprous oxide material that is part of the catalytic reactor. This material reacts at 800 to 1000 degrees Fahrenheit with hydrogen cyanide, producing water and nitrogen, with the concomitant production of cupric oxide. The cupric oxide acts as an oxidation catalyst at these temperature particularly for chlorinated materials.

After being reacted upon in the catalytic reactor 154, the gas 14 exits the catalytic reactor 154 through the conventional ducting 162 and enters into the inlet end 170 of the optional polisher 172. In the polishing step any acid gas materials produced from sulfur, chlorine, or fluorine present in the chemical agent that penetrate through the reactors 151 is removed. Sufficient water vapor is present in the gas 14 to ensure the formation of hydrochloric acid rather than free chlorine. The calcium carbonate bed provides a very effective absorption/reaction system at 800 to 1000 degrees Fahrenheit. The bed 172 also acts as a filter for solid products of agent decomposition left in the gas 14 stream.

From the reactor outlet end 174 the gas 14 is directed through the conventional ducting 176 to the conventional alkaline absorber 180 to complete the final step of purification of the gas 14. The temperature of the purified gas 14 is however rather high, approximately 800 degrees Fahrenheit, and must be lowered to insure public use. The lowering of the gas 14 temperature is accomplished in the second primary surface heat exchanger 190. The gas 14 is directed into the inlet 198 of the heat exchanger 190 through the conventional ducting 182 from the absorber 180. The gas 14 is directed through the hot gas 14 dissipation passages 204 wherein heat from the hot gas 14 is dissipated to the cooling gas 222 within the cooling gas recipient passages 206. The expansion turbine 240 extracts the purified and cooled gas 14 from the heat exchanger 190 and directs the gas 14 into the compartment, cabin or area in which the clean gas is to be used for its intended purpose. The atmospheric air 222 is drawn through the second inlet 220 and the cooling gas 222 recipient passages 206 of the heat exchanger 190 by the fan 242. After being used to cool the gas 14, the air 222 is returned to the atmosphere.

The primary advantage of the present system over existing air purification systems stems from the total combination of the entire system. For example, the use of the cyclone filter 31 to remove particles 43 having a diameter of greater than 5 microns in size from the gas 14 and the scavenging system 46 greatly increases the efficiency of the system and reduces the complexity of the system. The heating of the gas 14 by the heat exchanger 102 to a high temperature level, between approximately 800 and 1000 degrees Fahrenheit greatly increases the efficiency and effectiveness of the two-stage reactor process, the thermal cracking reactor 152 and the catalytic reactor 154. For example, the high temperature and the copper oxide used as the catalyst eliminates the need of an absorber bed between the thermal reactor 152 and the catalytic reactor 154. Thus, the system 10 disclosed above is less susceptible to poisoning. And, to further insure the efficiency of the system 10 the solids filter 172 and the alkaline absorber 180 are used. After the purification process, the high temperature gas 14 is reduced by the expansion within the supersonic turbine to a level usable for public consumption and the cooled purified gas 14 is directed to the cab or shelter.

Other aspects, objects and advantages will become apparent from a study of the specification, drawings and appended claims.

I claim:

1. A gas purification and thermal conditioning system for removal of an objectionable impurity generally not acceptable for public consumption and temperature control of said purified gas for future use in a confined area, said gas purification and thermal conditioning system comprising:

a gas turbine engine including a compressor section in which a gas is compressed, a combustor section being interconnected with the compressor section;

a condensed phase gas filtering/separating apparatus being positioned upstream of said compressor section, in fluid communication with the compressor section and wherein said gas is at least partially purified;

a first heat exchanger being positioned downstream of said compressor section and in fluid communication with the compressor section;

means for further purifying the gas being positioned downstream of said first heat exchanger and in fluid communication with the first heat exchanger, said means for further purifying the gas including a reactor system;

means for polishing being positioned downstream of said first heat exchanger and in fluid communication with the first heat exchanger, said means for polishing having a solids filter and an alkaline absorber therein; and a second heat exchanger being positioned downstream of said means for further purifying and said means for polishing and in fluid communication with said means for polishing.

2. The gas purification and thermal conditioning system of claim 1 wherein said gas filtering apparatus has the capability of filtering particles having a diameter greater than about 5 microns from the gas passing therethrough.

3. The gas purification and thermal conditioning system of claim 1 wherein said filtering apparatus includes a cyclone filter and a scavenging system.

4. The gas purification and thermal conditioning system of claim 1 wherein said filtering apparatus includes a single stage barrier filter.

5. The gas purification an thermal conditioning system of claim 4 wherein said single stage barrier filter includes a stand-alone unit having the capabilities of being self cleaning.

6. The gas purification and thermal conditioning system of claim 1 wherein said first heat exchanger is a primary surface type heat exchanger.

7. The gas purification and thermal conditioning system of claim 1 wherein said first heat exchanger increases the temperature of the partially purified gas to a range of between 800 to 1000 degrees Fahrenheit.

8. The gas purification and thermal conditioning system of claim 1 wherein said first heat exchanger increases the temperature of the partially purified gas to about 1000 degrees Fahrenheit.

9. The gas purification and thermal conditioning system of claim 1 wherein said reactor system includes a pair of reactor beds.

10. The gas purification and thermal conditioning system of claim 9 wherein said pair of reactor beds includes a thermal reactor including a mixing section having a plurality of internal walls being coated with alumina.

11. The gas purification and thermal conditioning system of claim 10 wherein said mixing section further has a plurality of alumina Raschig rings therein.

12. The gas purification and thermal conditioning system of claim 9 wherein said pair of reactor beds includes a catalytic reactor including an afterburner, said afterburner being packed with an oxidation catalyst.

13. The gas purification and thermal conditioning system of claim 12 wherein said oxidation catalyst is a copper oxide.

14. The gas purification and thermal conditioning system of claim 1 wherein said means for polishing includes a polisher being packed with a bed of calcium carbonate.

15. The gas purification and thermal conditioning system of claim 1 wherein said second heat exchanger is a primary surface type heat exchanger.

* * * * *